US012211990B2

(12) United States Patent
Wu et al.

(10) Patent No.: US 12,211,990 B2
(45) Date of Patent: Jan. 28, 2025

(54) ELECTROLYTIC COPPER FOIL AND ELECTRODE AND LITHIUM-ION CELL COMPRISING THE SAME

(71) Applicant: Chang Chun Petrochemical Co., Ltd., Taipei (TW)

(72) Inventors: Chih-Chung Wu, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 202 days.

(21) Appl. No.: 17/959,705

(22) Filed: Oct. 4, 2022

(65) Prior Publication Data

US 2023/0420640 A1 Dec. 28, 2023

(30) Foreign Application Priority Data

Jun. 28, 2022 (CN) .......................... 202210740012.2
Jun. 28, 2022 (TW) ................................. 111124124
(Continued)

(51) Int. Cl.
*H01M 4/134* (2010.01)
*H01M 10/0525* (2010.01)
*H01M 4/02* (2006.01)

(52) U.S. Cl.
CPC ....... *H01M 4/134* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| 2019/0355993 | A1* | 11/2019 | Lee ........................... C25D 1/04 |
| 2020/0277705 | A1* | 9/2020 | Kim ........................... C25D 1/04 |
| 2020/0350620 | A1* | 11/2020 | Chen ........................ C25D 5/10 |

FOREIGN PATENT DOCUMENTS

| CN | 109112616 | 1/2019 |
| EP | 3121885 | 1/2017 |

(Continued)

OTHER PUBLICATIONS

Taiwan Examination Report of TW 111132287, May 16, 2023.
(Continued)

*Primary Examiner* — Wyatt P McConnell
(74) *Attorney, Agent, or Firm* — WPAT, P.C.

(57) ABSTRACT

Provided are an electrolytic copper foil, an electrode and a lithium-ion cell comprising the same. The electrolytic copper foil has a first surface and a second surface, which are analyzed by grazing incidence X-ray diffraction (GIXRD), and each have an intensity of a characteristic peak of (111) plane denoted by $I_1$, an intensity of a characteristic peak of (200) plane denoted by $I_2$, an intensity of a characteristic peak of (220) plane denoted by $I_3$, an FWHM of the characteristic peak of (111) plane denoted by $W_1$, and an FWHM of the characteristic peak of (200) plane denoted by $W_2$. The first and second surfaces each have a ratio of $(I_1+I_2)/(I_1+I_2+I_3)$ of 0.83 or more and a value of $(W_1+W_2)$ of 0.80° or less. By controlling the features, it can improve the corrosion resistance of the electrolytic copper foil and further increase the safety of the lithium-ion cell.

20 Claims, 2 Drawing Sheets

(30) Foreign Application Priority Data

Aug. 26, 2022 (CN) .......................... 202211033468.1
Aug. 26, 2022 (TW) ................................ 111132287

(56) References Cited

FOREIGN PATENT DOCUMENTS

| | | |
|---|---|---|
| JP | 2017079208 | 4/2017 |
| JP | 6379207 | 8/2018 |
| JP | 2022517051 | 3/2022 |
| KR | 20170088614 | 8/2017 |
| TW | 201900939 | 1/2019 |
| TW | 202041720 | 11/2020 |
| TW | 202118905 | 5/2021 |
| WO | WO2018207786 | 11/2018 |
| WO | 2022054597 | 3/2022 |

OTHER PUBLICATIONS

EPC Search Report of EP22196500.7, Jun. 5, 2023.
Decision of Approval, TW 111132287, Dec. 18, 2023.
Hajami et al., "Characterization of thin Zn—Ni alloy coatings electrodeposited on low carbon steel"—Nov. 2007.
Zhang et al., "Study on ferroelectric behaviors and ferroelectric nanodomains of YMnO3 thin film", Sep. 2014.
Bruker AXS, D8 Advance ECO, 2013.
Examination Report of JP2022-163206, Oct. 8, 2024, Japan.
Examination Report of KR10-2022-0152576, Nov. 8, 2024.

\* cited by examiner

ELECTROLYTIC COPPER FOIL AND ELECTRODE AND LITHIUM-ION CELL COMPRISING THE SAME

CROSS-REFERENCE TO RELATED APPLICATION

Pursuant to 35 U.S.C. § 119(a), this application claims the benefits of the priorities of Taiwan Patent Application No. 111124124 and China Patent Application No. 202210740012.2 both filed on Jun. 28, 2022 and the priorities of Taiwan Patent Application No. 111132287 and China Patent Application No. 202211033468.1 both filed on Aug. 26, 2022. The contents of the prior applications are incorporated herein by their entirety.

BACKGROUND OF THE INVENTION

1. Field of the Invention

The invention relates to an electrolytic copper foil, particularly to an electrolytic copper foil for a lithium-ion cell, an electrode comprising the same, and a lithium-ion cell.

2. Description of the Prior Arts

Copper foil has good electrical conductivity and lower cost compared to precious metals such as silver. It has been widely applied in basic industries and become an important starting material in advanced technology industries. For instance, copper foil can be used as an electrode material for a lithium-ion cell, which is widely applied in the fields of portable electronic devices (PED), electric vehicles (EV), and energy storage systems (ESS).

When the copper foil acts as an electrode material in a lithium-ion cell, the electrolyte solution in the lithium-ion cell is corrosive to the copper foil. As the operation time increases, the copper foil would be corroded by the electrolyte solution due to long-term operation. This shortens the cycle life of the lithium-ion cell, reduces the reliability of the lithium-ion cell, and gives rise to safety concerns.

In view of this, a corrosion resistance treatment is currently attempted to perform on the copper foil, expecting that the aforesaid problems can be mitigated or reduced. Common anti-corrosion treatment can be classified into protection with a cover layer or protection by a corrosion inhibitor. Protection with a cover layer is implemented by coating a corrosion resistance material layer onto the surface of copper foil or electroplating a highly corrosion resistant metal layer on the copper foil. However, the bonding strength between the copper foil and either the corrosion resistance material layer or the highly corrosion resistant metal layer should be considered. Once the aforesaid cover layer is detached from the copper foil, the copper foil would be corroded directly. On the other hand, protection by the corrosion inhibitor has the advantages of less dosage and good effect, but it brings height limits in the following application. Therefore, the copper foil protected by a corrosion inhibitor is not suitable for the long-term operation under high temperature, and it only can be used in a closed circulation system.

Therefore, it is still awaited to actively seek other manners for improving the corrosion resistance of the copper foil, so as to improve the safety of a lithium-ion cell.

SUMMARY OF THE INVENTION

In view of the shortcomings in the prior arts, one of the objectives of the instant disclosure is to provide an improved copper foil with excellent corrosion resistance. Particularly, the improved copper foil can effectively resist the corrosion by the electrolyte solution.

To achieve the aforesaid objectives, the instant disclosure provides an electrolytic copper foil comprising a first surface and a second surface opposite the first surface. The first surface and the second surface are analyzed by grazing incidence X-ray diffraction (GIXRD), and the first surface and the second surface each have an intensity of a characteristic peak of (111) plane denoted by $I_1$, an intensity of a characteristic peak of (200) plane denoted by $I_2$, an intensity of a characteristic peak of (220) plane denoted by $I_3$, a full width at half maximum (FWHM) of the characteristic peak of (111) plane denoted by $W_1$, and an FWHM of the characteristic peak of (200) plane denoted by $W_2$. The first surface and the second surface each have a ratio of $(I_1+I_2)/(I_1+I_2+I_3)$ more than or equal to 0.83 and a value of $(W_1+W_2)$ less than or equal to 0.80°.

By controlling the intensity of the characteristic peak of (111) plane denoted by $I_1$, the intensity of the characteristic peak of (200) plane denoted by $I_2$, the intensity of the characteristic peak of (220) plane denoted by $I_3$, the FWHM of the characteristic peak of (111) plane denoted by $W_1$, and the FWHM of the characteristic peak of (200) plane denoted by $W_2$ of each of the first and second surfaces to make the first surface and second surface each have a ratio of $(I_1+I_2)/(I_1+I_2+I_3)$ more than or equal to 0.83 and a value of $(W_1+W_2)$ less than or equal to 0.80°, it is capable of improving the electrolytic copper foil's corrosion resistance to the electrolyte solution, thereby improving the safety of the lithium-ion cell.

Besides, a yield strength of the electrolytic copper foil may be more than 230 megapascals (MPa). Preferably, the yield strength of the electrolytic copper foil may be more than or equal to 231 MPa and less than or equal to 300 MPa. More preferably, the yield strength of the electrolytic copper foil may be more than or equal to 231 MPa and less than or equal to 270 MPa. When the yield strength of the electrolytic copper foil of the instant disclosure is further controlled to be more than 230 MPa, a lithium-ion cell comprising the electrolytic copper foil can have superior cycle life.

Preferably, the first surface and the second surface may each have the ratio of $(I_1+I_2)/(I_1+I_2+I_3)$ more than or equal to 0.84 and less than or equal to 1.00. More preferably, the first surface and the second surface may each have the ratio of $(I_1+I_2)/(I_1+I_2+I_3)$ more than or equal to 0.84 and less than or equal to 0.95. In one embodiment, the first surface may have the ratio of $(I_1+I_2)/(I_1+I_2+I_3)$ more than or equal to 0.85 and less than or equal to 0.95, and the second surface may have the ratio of $(I_1+I_2)/(I_1+I_2+I_3)$ more than or equal to 0.84 and less than or equal to 0.92. By controlling the intensity ratio of the characteristic peaks of (111) plane and (200) plane, the electrolytic copper foil can have improved corrosion resistance.

Preferably, the first surface and the second surface may each have the value of $(W_1+W_2)$ more than or equal to 0.25 and less than or equal to 0.75. More preferably, the first surface and the second surface may each have the value of $(W_1+W_2)$ more than or equal to 0.28 and less than or equal to 0.74. In one embodiment, the first surface may have the value of $(W_1+W_2)$ more than or equal to 0.28 and less than or equal to 0.74, and the second surface may have the value of $(W_1+W_2)$ more than or equal to 0.43 and less than or equal to 0.65.

In one embodiment, the first surface of the electrolytic copper foil may have a root mean square height (Sq) more than or equal to 0.20 μm and less than or equal to 0.55 μm.

By controlling the Sq of the first surface of the electrolytic copper foil within the range of 0.20 μm and 0.55 μm, the coating quality of the active materials coated on the electrolytic copper foil can be improved. This makes the electrolytic copper foil suitable as an electrode material of a lithium-ion cell, and the lithium-ion cell comprising the electrolytic copper foil can have the advantages of high capacity. In another embodiment, the first surface and the second surface of the electrolytic copper foil may each have Sq more than or equal to 0.20 μm and less than or equal to 0.55 μm. In yet another embodiment, the first surface of the electrolytic copper foil may have Sq more than or equal to 0.20 μm and less than or equal to 0.55 μm, and the second surface of the electrolytic copper foil may have Sq more than or equal to 0.25 μm and less than or equal to 0.50 μm.

In one embodiment, an absolute difference between the Sq of the first surface and the Sq of the second surface of the electrolytic copper foil may be less than 0.15 μm. In another embodiment, the absolute difference between the Sq of the first surface and the Sq of the second surface of the electrolytic copper foil may be less than 0.145 μm.

In one embodiment, a thickness of the electrolytic copper foil may be 4 micrometers (μm) to 20 μm. In another embodiment, the thickness of the electrolytic copper foil may be 6 μm to 20 μm.

The instant disclosure also provides an electrode of a lithium-ion cell, which comprises the aforesaid electrolytic copper foil.

Moreover, the instant disclosure provides a lithium-ion cell, which comprises the aforesaid electrode.

In accordance with the instant disclosure, the electrolytic copper foil is applicable as a negative electrode of a lithium-ion cell and a positive electrode of a lithium-ion cell. Aforesaid electrolytic copper foil is applicable to be a current collector. One or both of the surfaces of electrolytic copper foil may be coated with at least one layer of active materials to prepare an electrode of a lithium-ion cell.

In accordance with the instant disclosure, the active material may be classified into positive electrode active material and negative electrode active material. The negative electrode active substance contained in the negative electrode active material may be a carbon-containing substance, a silicon-containing substance, a silicon carbide composite, a metal, a metal oxide, a metal alloy or a polymer, wherein the carbon-containing substance or the silicon-containing substance is preferable, but it is not limited thereto. Specifically, the carbon-containing substance may be, but is not limited to, a mesophase graphite powder (MGP), a non-graphitizing carbon, a coke, a graphite, a glasslike carbon, a carbon fiber, an activated carbon, a carbon black or a high polymer calcined substance. The coke may comprise pitch coke, needle coke or petroleum coke, etc. The high polymer calcined substance may be obtained by calcining a phenol-formaldehyde resin or a furan resin at a suitable temperature for carbonation. The silicon-containing substance may have an excellent ability to form an alloy with lithium ions and an excellent ability to extract lithium ions from the lithium alloy. When the silicon-containing substance is applied to a lithium-ion secondary cell, a high energy density secondary cell can be achieved. The silicon-containing substance may be combined with cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), chromium (Cr), ruthenium (Ru), molybdenum (Mo), or combinations thereof to form an alloy. The element of the metal or metal alloy may be selected from the group consisting of Co, Fe, Sn, Ni, Cu, Mn, Zn, In, Ag, Ti, Ge, Bi, Sb, Cr, Ru, and Mo, but it is not limited thereto. Examples of the aforesaid metal oxide may be, but are not limited to, ferric oxide, ferric ferrous oxide, ruthenium dioxide, molybdenum dioxide and molybdenum trioxide. Examples of the aforesaid polymers may include, but are not limited to, polyacetylene and polypyrrole.

In one embodiment, an auxiliary additive may be added into the active material depending on different needs. Aforesaid auxiliary additive may be, but is not limited to, an adhesive and/or a weak acid reagent. Preferably, the adhesive may be, but is not limited to, polyvinylidene fluoride (PVDF), styrene-butadiene rubber (SBR), carboxymethyl cellulose (CMC), poly(acrylic acid) (PAA), polyacrylonitrile (PAN) or polyacrylate, and the weak acid reagent may be, but is not limited to, oxalic acid, citric acid, lactic acid, acetic acid, or formic acid.

In accordance with the instant disclosure, depending on the positive electrode active substance, the lithium-ion cell may be classified into $LiCoO_2$ cell, $LiNiO_2$ cell, $LiMn_2O_4$ cell, $LiCo_xNi_{1-x}O_2$ cell, or $LiFePO_4$ cell, etc., but it is not limited thereto.

In accordance with the instant disclosure, the electrolyte solution may comprise a solvent, an electrolyte, or an additive added whenever appropriate. The solvent of the electrolyte solution may comprise a non-aqueous solvent, for example, a cyclic carbonate such as ethylene carbonate (EC) or propylene carbonate (PC); a linear carbonate such as dimethyl carbonate (DMC), diethyl carbonate (DEC), or ethyl methyl carbonate (EMC); or sultone, but it is not limited thereto. Aforesaid solvent may be used alone or in combination of two or more solvents. The electrolyte may comprise lithium hexafluorophosphate, lithium perchlorate, lithium tetrafluoroborate, lithium trifluoromethanesulfonate, lithium bis(oxalate)borate, or lithium bis(trifluoromethane sulfonimide), but it is not limited thereto.

In some embodiments, the electrolyte solution may be replaced by solid electrolyte, such as, but not limited to, crystalline electrolyte, glassy electrolyte, glass-ceramic electrolyte or polymer electrolyte, in a lithium-ion cell. Specifically, the crystalline electrolyte may be a sulfide solid electrolyte such as lithium superionic conductor (LISICON) or argyrodite, or an oxide solid electrolyte such as Garnet-type electrolyte, Peroskite-type electrolyte, NASICON-type electrolyte, but it is not limited thereto. The glassy electrolyte may be an oxide glass electrolyte or a sulfide glass electrolyte, but it is not limited thereto. The glass-ceramic electrolyte may be an oxide glass-ceramic electrolyte or a sulfide glass-ceramic electrolyte, but it is not limited thereto. The polymer electrolyte may be a pure solid polymer electrolyte, such as polyethylene oxide-based (PEO-based) electrolyte and polypropylene oxide-based (PPO-based) electrolyte; or a gel polymer electrolyte such as polyacrylonitrile-based (PAN-based) electrolyte, poly(methyl methacrylate)-based (PMMA-based) electrolyte, poly(vinyl chloride)-based (PVC-based) electrolyte, or poly(vinylidene fluoride)-based (PVDF-based) electrolyte, but it is not limited thereto.

In accordance with the instant disclosure, the aforesaid lithium-ion cell may be a stacked lithium-ion cell comprising the negative electrode and the positive electrode stacked through the separator, or may be a spirally-wound lithium-ion cell comprising a continuous electrode and the separator spirally wound and stacked together, but it is not limited thereto. Depending on various products, the lithium-ion cell of the instant disclosure may be applied as a cylindrical secondary cell, a square secondary cell, a pouch type secondary cell, or a coin type secondary cell for personal notebook computers, mobile phones, electric vehicles and energy storage systems, but it is not limited thereto.

Unless otherwise specified, the parameters, conditions, values or numerical ranges set forth in this specification may be understood to be expressed by the term "about". The term "about" may be expressed as within ±5% of a stated value.

DETAILED DESCRIPTION OF THE PREFERRED EMBODIMENTS

Hereinafter, several embodiments are described to illustrate the embodiments of an electrolytic copper foil, an electrode, and a lithium-ion cell of the instant disclosure, and several comparative examples are provided for comparison. One person skilled in the art can easily realize the advantages and effects of the present invention from the following examples and comparative examples. It should be understood that the descriptions proposed herein are just preferable examples for the purpose of illustrations only, not intended to limit the scope of the instant disclosure. One person skilled in the art can make various modifications and variations to practice or apply the instant disclosure in accordance with the ordinary knowledge without departing from the spirit and scope of the instant disclosure.

Figure 1:
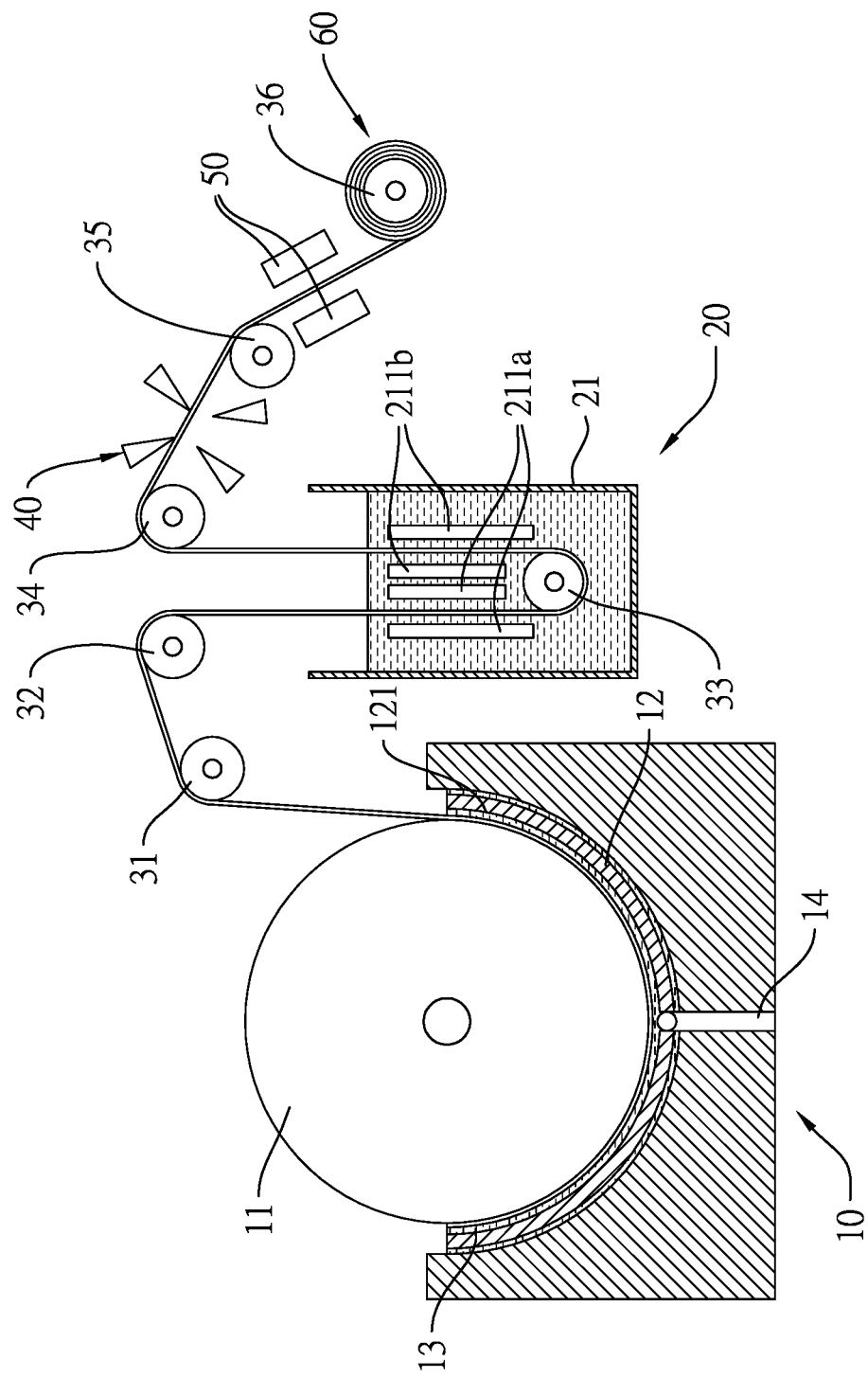
FIG. 1 is a schematic view of preparing electrolytic copper foils of Examples 1 to 12 and Comparative Examples 1 to 5.

As shown in FIG. 1, the production apparatus for producing the electrolytic copper foil comprises an electrodeposition equipment 10, an anti-tarnish treatment equipment 20, and a series of guide rollers. The electrodeposition equipment 10 comprises a cathode drum 11, an insoluble anode 12, a copper electrolyte solution 13 and a feed pipe 14. The cathode drum 11 is a rotatable titanium cathode drum. The insoluble anode 12 is an $IrO_2$ coated titanium plate set below the cathode drum 11 and substantially surrounds the lower half of the cathode drum 11. The insoluble anode 12 has an anode surface 121 facing the cathode drum 11. The cathode drum 11 and the insoluble anode 12 are spaced apart from each other to accommodate the copper electrolyte solution 13 introduced through the feed pipe 14. The anti-tarnish treatment equipment 20 comprises an anti-tarnish treatment tank 21 and two sets of anode plates 211a and 211b disposed therein. The series of guide rollers comprise a first guide roller 31, a second guide roller 32, a third guide roller 33, a fourth guide roller 34, a fifth guide roller 35, and a sixth guide roller 36. Aforesaid guide rollers can transport a raw copper foil prepared by electrodeposition to the anti-tarnish treatment equipment 20 for anti-tarnish treatment, then excess anti-tarnish substances are removed from the surface of the anti-tarnish treated raw copper foil with an air knife 40. After that, the anti-tarnish treated raw copper foil is further annealed by a medium wave infrared treatment equipment 50, and finally the electrolytic copper foil 60 is wound on the sixth guide roller 36.

For preparation of the electrolytic copper foil of the instant disclosure, the parameters of electrodeposition can be modified depending on different needs. In one embodiment, the copper electrolyte solution used in electrodeposition may comprise copper sulfate, sulfuric acid, chloride ions, sodium 3-mercapto-1-propanesulfonate (MPS), and polyoxyethylene sorbitan fatty acid ester (Tween 20), but it is not limited thereto. In said embodiment, the concentration of the copper sulfate may be 200 grams per liter (g/L) to 400 g/L, the concentration of the sulfuric acid may be 80 g/L to 150 g/L, the concentration of chloride ions may be 20 ppm to 60 ppm, the concentration of MPS may be 20 ppm to 30 ppm, and the concentration of Tween 20 may be 20 ppm to 60 ppm. In the electrodeposition step, the temperature of the copper electrolyte solution may be 40° C. to 50° C., and the current density may be set at 40 Amperes per square decimeter ($A/dm^2$) to 50 $A/dm^2$.

In accordance with the instant disclosure, the characteristics of the electrolytic copper foil can be modified by the composition of the copper electrolyte solution and related parameters in the electrodeposition step. For example, the crystal morphology of grains, the yield strength, and the root mean square height of the electrolytic copper foil may be modified by, but not limited to, the amount of Tween 20 of the copper electrolyte solution and the roughness (Rz) of the anode surface of the insoluble anode of the electrodeposition equipment.

For preparation of the electrolytic copper foil of the instant disclosure, an anti-tarnish treatment may be adopted depending on different needs. The adopted anti-tarnish solution may be, but is not limited to, chromium anti-tarnish solution, nickel anti-tarnish solution, zinc anti-tarnish solution, tin anti-tarnish solution, etc. In one embodiment, the anti-tarnish solution may be chromium anti-tarnish solution in which the concentration of the chromic acid may be 1.5 g/L to 5.0 g/L. The current density of the anti-tarnish treatment may be set at 0.5 $A/dm^2$ to 6.0 $A/dm^2$, the temperature of the chromium anti-tarnish solution may be 20° C. to 40° C., the period of the anti-tarnish treatment may be 2 seconds (sec) to 4 sec, but they are not limited thereto.

For preparation of the electrolytic copper foil of the instant disclosure, a medium wave infrared annealing treatment may be adopted depending on different needs. As shown in FIG. 1, after removing the excess anti-tarnish substances on the surface of anti-tarnish treated raw copper foil with the air knife 40, it may be further annealed by a medium wave infrared treatment equipment 50, and then the electrolytic copper foil 60 is wound on the sixth guide roller 36. In one embodiment, the medium wave infrared annealing treatment may be applied to one or both surfaces of the electrolytic copper foil. For medium wave infrared annealing, the lamp filament temperature may range from 1500° C. to 1800° C., the maximum wavelength may be 1.4 micrometers (μm) to 1.8 μm, the distance between the medium wave infrared treatment equipment and the electrolytic copper foil may be 30 millimeters (mm) to 60 mm, and the annealing time may be 5 seconds (sec) to 15 sec. The crystal morphology of grains, the yield strength, and the root mean square height of the electrolytic copper foil may be modified by, but not limited to, the annealing time.

Electrolytic Copper Foil

Examples 1 to 12: Electrolytic Copper Foil

The electrolytic copper foils of Examples 1 to 12 were produced by similar electrodeposition step, anti-tarnish step, and medium wave infrared annealing step with a production apparatus of FIG. 1. The method for producing the electrolytic copper foils of Examples 1 to 12 was described as follows.

First, the copper electrolyte solution 13 used in the electrodeposition step was prepared. During the electrodeposition step, the cathode drum 11 was rotated on a fixed axis at a constant speed and a current was applied between the cathode drum 11 and the insoluble anode 12, so that copper ions of the copper electrolyte solution 13 were electrodeposited on the surface of the cathode drum 11 to form the raw copper foil. Then the raw copper foil was stripped from the cathode drum 11 and guided to the first guide roller 31.

Herein, the composition of the copper electrolyte solution 13 and the parameters of the electrodeposition step were described as follows:

I. Composition of the Copper Electrolyte Solution 13:
   Copper sulfate ($CuSO_4 \cdot 5H_2O$): about 320 g/L;
   Sulfuric acid: about 110 g/L;
   Chloride ions ($Cl^-$): about 25 ppm;
   Sodium 3-mercapto-1-propanesulfonate (MPS, purchased from HOPAX): about 20 ppm; and
   Tween 20: concentration as shown in Table 1.

II. Parameters of the Electrodeposition Step:
   Temperature of the copper electrolyte solution 13: about 50° C.;
   Rz of the anode surface: as shown in Table 1; and
   Current density: about 50 A/dm$^2$.

Said Rz of the anode surface is directed to the maximum height defined by JIS B 0601-1994. The instrument and parameters of measuring Rz of the anode surface were described as follows:

I. Measurement Instrument:
   PORTABLE surface roughness tester (contact mode): SJ-410, purchased from Mitutoyo.

II. Measurement Parameters:
   Radius of needle tip: 2 μm;
   Angle of needle tip: 60°;
   Cut off length (λc): 0.8 mm; and
   Evaluation length: 4 mm.

After that, the raw copper foil was transported by the first guide roller 31 and the second guide roller 32 to the anti-tarnish treatment equipment 20, and the raw copper foil was immersed into the anti-tarnish treatment tank 21 filled with chromium anti-tarnish solution. Then the two opposite surfaces of the raw copper foil underwent anti-tarnish treatment by two sets of anode plates 211a and 211b through the transportation of the third guide roller 33, such that a first anti-tarnish layer and a second anti-tarnish layer were electrodeposited on the two opposite surfaces of the raw copper foil.

Herein, the composition of the chromium anti-tarnish solution and the parameters of the anti-tarnish treatment are described as follows:

I. Composition of the Chromium Anti-Tarnish Solution:
   Chromic acid ($CrO_3$): about 1.5 g/L;

II. Parameters of the Anti-Tarnish Treatment:
   Temperature of the solution: 25° C.;
   Current density: about 0.5 A/dm$^2$; and
   Processing time: about 2 seconds.

After the completion of the anti-tarnish treatment, the anti-tarnish treated copper foil was guided to the fourth guide roller 34. Excess anti-tarnish substances were removed from the surface and the anti-tarnish treated copper foil was dried by the air knife 40. Then aforesaid anti-tarnish treated copper foil was transported by the fifth guide roller 35 towards the medium wave infrared treatment equipment 50 for annealing two surfaces of the anti-tarnish treated copper foil, and finally the electrolytic copper foil 60 was obtained and wound on the sixth guide roller 36.

Herein, the conditions of the annealing treatment are described as follows:

I. Parameters of the Medium Wave Infrared Treatment Equipment 50:
   Diameter of lamp tube: 23×11 mm/34×14 mm;
   Lamp filament temperature: 1600±10° C.;
   Maximum wavelength: 1.4 μm to 1.8 μm;
   Maximum power: 120 kilowatts per square meter (kW/m$^2$); and
   Maximum linear power density: 80 watts per centimeter (W/cm).

II. Parameters of the Annealing Treatment:
   Distance between the lamp tube and the electrolytic copper foil to be annealed: 45 mm;
   Power: 95%; and
   Annealing time: as shown in Table 1.

Figure 2:
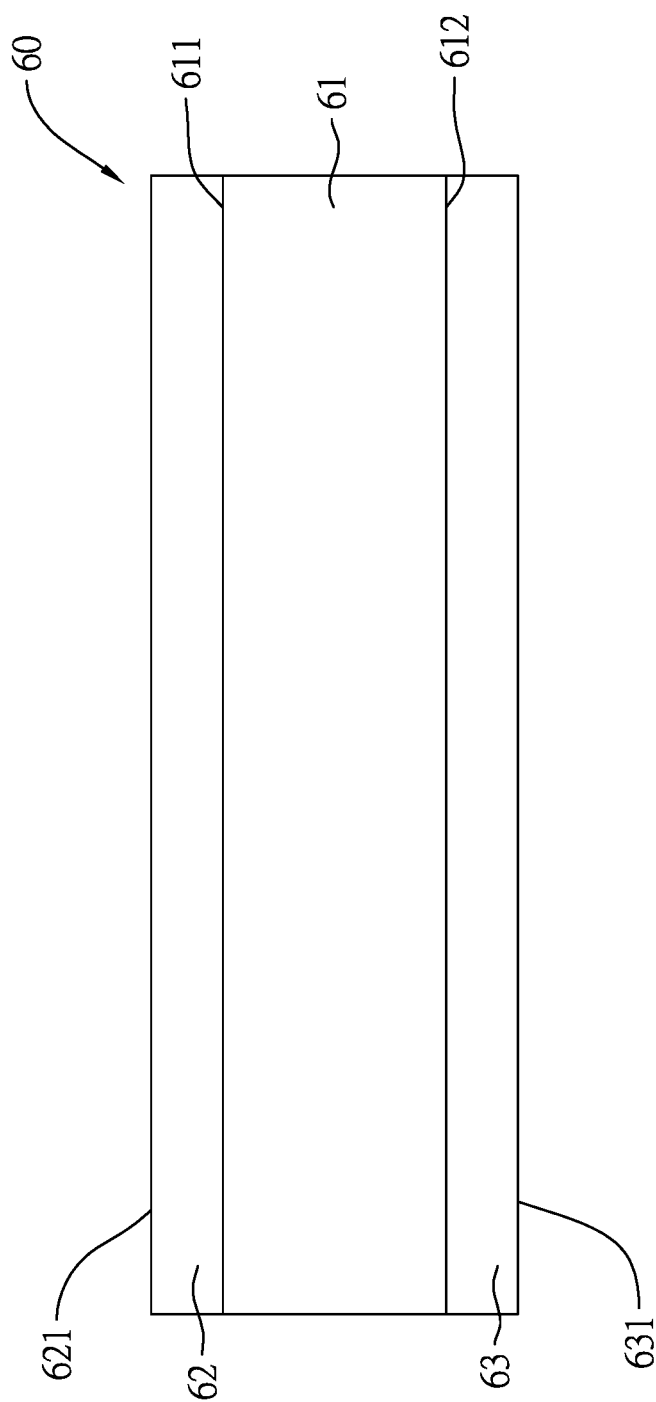
FIG. 2 is a schematic side view of the electrolytic copper foils of Examples 1 to 12 and Comparative Examples 1 to 5.

According to the aforesaid method, about 6 μm-thick electrolytic copper foils of Examples 1 to 8, 11 and 12, about 4 μm-thick electrolytic copper foil of Example 9, and about 20 μm-thick electrolytic copper foil of Example 10 were obtained. The differences between Examples 1 to 12 were the thickness of the electrolytic copper foil, the concentration of Tween 20 in the copper electrolyte solution, the roughness of the anode surface in the electrodeposition step, and the annealing time. As shown in FIG. 2, the electrolytic copper foil 60 of each example comprises a copper layer 61 (corresponding to the raw copper foil which is not treated with the anti-tarnish treatment), a first anti-tarnish layer 62, and a second anti-tarnish layer 63. The copper layer 61 comprises a deposited side 611 and a drum side 612 opposite the deposited side 611. During the electrodeposition, the deposited side 611 was the surface of the raw copper foil facing the insoluble anode, and the drum side 612 was the surface of the raw copper foil in contact with the cathode drum. The first anti-tarnish layer 62 was formed on the deposited side 611 of the copper layer 61, and the first anti-tarnish layer 62 has a first surface 621 at the outermost. The second anti-tarnish layer 63 is formed on the drum side 612 of the copper layer 61, and the second anti-tarnish layer 63 has a second surface 631 at the outermost. The first surface 621 and the second surface 631 are the two outermost surfaces of the electrolytic copper foil 60, and they are opposite to each other.

Comparative Examples 1 to 5: Electrolytic Copper Foil

The electrolytic copper foils of Comparative Examples 1 to 5 were provided for comparison with Examples 1 to 12. The method of preparing the electrolytic copper foils of Comparative Examples 1 to 5 was similar to that of Examples 1 to 12, except the thickness of the electrolytic copper foil, concentration of Tween 20 in the copper electrolyte solution, the Rz of the anode surface in the electrodeposition step, and the annealing time. The parameters were all listed in Table 1. Besides, the electrolytic copper foils of Comparative Examples 1 to 5 have a similar structure as shown in FIG. 2, all of which have a thickness of 6 μm.

TABLE 1 thickness of the electrolytic copper foils of Examples 1 to 12 (E1 to E12) and Comparative Examples 1 to 5 (C1 to C5) as well as the concentration of Tween 20 in the copper electrolyte solution, Rz of the anode surface, and annealing time in preparation of E1 to E12 and C1 to C5

|  | Thickness (μm) | Conc. of Tween 20 (ppm) | Rz of Anode Surface (μm) | Annealing Time (sec) |
|---|---|---|---|---|
| E1  | 6  | 20 | 2  | 5  |
| E2  | 6  | 35 | 2  | 5  |
| E3  | 6  | 50 | 2  | 5  |
| E4  | 6  | 20 | 2  | 10 |
| E5  | 6  | 20 | 2  | 15 |
| E6  | 6  | 35 | 2  | 10 |
| E7  | 6  | 35 | 8  | 10 |
| E8  | 6  | 35 | 15 | 10 |
| E9  | 4  | 35 | 8  | 10 |
| E10 | 20 | 35 | 8  | 10 |
| E11 | 6  | 60 | 2  | 5  |
| E12 | 6  | 35 | 17 | 10 |
| C1  | 6  | 10 | 2  | 5  |
| C2  | 6  | 20 | 2  | 2  |
| C3  | 6  | 20 | 2  | 30 |
| C4  | 6  | 20 | 20 | 5  |
| C5  | 6  | 15 | 14 | 10 |

Test Example 1: Grazing Incidence X-Ray Diffraction (GIXRD)

The electrolytic copper foils of Examples 1 to 12 and Comparative Examples 1 to 5 as test samples were measured by using an X-ray diffractometer to conduct grazing incidence X-ray diffraction experiment, and the intensity of a characteristic peak of (111) plane denoted by $I_1$, the intensity of a characteristic peak of (200) plane denoted by $I_2$, the intensity of a characteristic peak of (220) plane denoted by $I_3$, the FWHM of the characteristic peak of (111) plane denoted by $W_1$, and the FWHM of the characteristic peak of (200) plane denoted by $W_2$ of the first surface and the second surface of each test sample were obtained in this experiment.

After calculation, the ratio of $(I_1+I_2)/(I_1+I_2+I_3)$ of the first surface, the value of $(W_1+W_2)$ of the first surface, the ratio of $(I_1+I_2)/(I_1+I_2+I_3)$ of the second surface, and the value of $(W_1+W_2)$ of the second surface of each of the electrolytic copper foils of Examples 1 to 12 and Comparative Examples were obtained. Results are listed in Tables 2 and 3 below.

Herein, the instrument and parameters of grazing incidence X-ray diffraction experiment are described as follows:

I. Measurement Instrument:
  X-ray diffractometer: Bruker D8 ADVANCE Eco.
II. Measurement Parameters:
  Incidence Angle: 0.8°.

Test Example 2: Yield Strength

The electrolytic copper foils of Examples 1 to 12 and Comparative Examples 1 to 5 as test samples were analyzed by IPC-TM-650 2.4.4.18 to obtain a stress-strain curve with the strain (ε) as X-axis and the stress (σ) as Y-axis. A parallel line to the Y-axis was drawn at a strain of 0.5%, and the yield strength was determined by the stress corresponding to the point of the intersection of the stress-strain curve and the line. Results are listed in Table 3.

Herein, the instrument and parameters of measuring yield strength of the electrolytic copper foil are described as follows:

I. Measurement Instrument:
  AG-I universal testing machine, purchased from Shimadzu Corp.
II. Measurement Parameters:
  Sample size: 100 mm (length)×12.7 mm (width);
  Chuck distance: 50 mm; and
  Crosshead speed: 50 mm/min.

Test Example 3: Root Mean Square Height (Sq)

The electrolytic copper foils of Examples 1 to 12 and Comparative Examples 1 to 5 were used as test samples. Root mean square heights (Sq) of the first surface and the second surface of each test sample were measured with the following conditions and defined by ISO 25178-2:2012. Results are listed in Table 3.

Herein, the instrument and conditions of measuring Sq of the electrolytic copper foil are described as follows:

I. Measurement Instrument:
  Laser scanning confocal microscope: LEXT OLS5000-SAF, purchased from Olympus Company; and
  Objective: MPLAPON-100xLEXT.
II. Measurement Conditions:
  Wavelength of light source: 405 nm;
  Magnification of objective: 100 times;
  Optical zoom: 1.0 time;
  Observation area: 129 μm×129 μm;
  Resolution: 1024 pixels×1024 pixels;
  Mode: auto tilt removal;
  Filter: no filter;
  Temperature: 24±3° C.; and
  Relative humidity: 63±3%.

Test Example 4: Corrosion Resistance

The aforesaid electrolytic copper foils of Examples 1 to 12 and Comparative Examples 1 to 5 as test samples were each cut into a 10 cm×10 cm specimen. The specimens were immersed in 60° C. of a lithium electrolyte solution of a lithium-ion cell for 24 hours, then taken out from the solution and put into a 60° C. oven to remove the solution on the specimen. The appearance of the specimens was visually observed to assess whether discoloration occurred. The lithium electrolyte solution was a 1 molarity (M) solution in which the solute of lithium hexafluorophosphate was dissolved in a mixture solvent of ethylene carbonate (EC) and diethyl carbonate (DEC) with a volume ratio of 1:1. If partial discoloration was observed on the specimen, which indicates the electrolytic copper foil had poor corrosion resistance to the electrolyte solution, it was ranked as "x". In contrast, if no discoloration occurred on any part of the whole specimen, which indicates the electrolytic copper foil had good corrosion resistance to the electrolyte solution, it was ranked as "◯". Assessment results are listed in Tables 2 and 3.

Electrode

Examples 1A to 12A and Comparative Examples 1A to 5A

Negative Electrode

The first surfaces and the second surfaces of the electrolytic copper foils of Examples 1 to 12 and Comparative Examples 1 to 5 were each coated with negative electrode slurry comprising negative electrode active substances to become a negative electrode of a lithium-ion cell. Specifically, the negative electrode could be produced by the steps as follows.

First, a negative electrode slurry was prepared, and the composition of the negative electrode slurry is described as follows:
- Mesophase graphite powder (MGP): 93.9 parts by weight, served as negative electrode active substance;
- Conductive carbon black (Super P): 1 part by weight, served as conductive additive;
- Polyvinylidene difluoride (PVDF 6020): 5 parts by weight, served as solvent binder;
- Oxalic acid: 0.1 part by weight; and
- N-methylpyrrolidone (NMP): 60 parts by weight.

Next, the negative electrode slurry was coated on the first surface and the second surface of each of the electrolytic copper foils with a coating thickness of 200 μm on each surface, then dried in a 160° C. oven and pressed by a pressing machine to obtain the negative electrodes of Examples 1A to 12A and Comparative Examples 1A to 5A.

Herein, the coating conditions and pressing conditions for producing the negative electrode are described as follows:

I. Coating Conditions:
- Coating speed: 5 meters/minute (m/min); and
- Coating thickness: about 200 μm on each surface.

II. Pressing Conditions:
- Pressing speed: 1 m/min;
- Pressing pressure: 3000 pounds per square inch (psi);
- Size of the rollers in the pressing machine: 250 mm (outside diameter, φ)×250 mm (width);
- Hardness of the rollers: 62 to 65 HRC; and
- Material of the rollers: high-carbon chromium bearing steel (SUJ2).

Test Example 5: Coating Quality

The negative electrode of Examples 1A to 12A and Comparative Examples 1A to 5A were used as test samples to evaluate whether active material exhibit good coating quality when the electrolytic copper foil is coated with the active materials in the preparation of negative electrode. Each test sample was visually observed on two surfaces thereof to figure out whether any fold or wrinkle was formed on the surfaces of each test sample. If any fold or wrinkle was observed on either surface of the test sample, it was ranked as "Δ", indicating that the test sample exhibit poor coating quality. If neither fold nor wrinkle was observed on the two surfaces of each test sample, it was ranked as "○", indicating that the test sample exhibits expected coating quality. Results are listed in Table 3.

Lithium-Ion Cell

Examples 1B to 12B and Comparative Examples 1B to 5B

Lithium-Ion Cell

The lithium-ion cell of Examples 1B to 12B and Comparative Examples 1B and 5B were respectively prepared by combining the negative electrodes of Examples 1A to 12A and Comparative Examples 1A and 5A with the same positive electrode. For convenience of description, the process of preparing the lithium-ion cells by using the aforesaid negative electrodes was described as follows.

First, a positive electrode slurry was prepared, and the composition of the positive electrode slurry was described as follows:
- $LiCoO_2$: 89 parts by weight, served as positive electrode substance;
- Flaked graphite (KS6): 5 parts by weight, served as conductive additive;
- Conductive carbon black (Super P): 1 part by weight, served as conductive additive;
- Polyvinylidene difluoride (PVDF 1300): 5 parts by weight, served as solvent binder; and
- N-methylpyrrolidone (NMP): 195 parts by weight.

Next, the positive electrode slurry was coated on two surfaces of an aluminum foil. After the solvent was evaporated, the positive electrode and each of the negative electrodes obtained from examples and comparative examples were cut into a specific size, and then the positive electrode and the negative electrode were alternately stacked with a microporous separator (model: Celgard 2400, manufactured by Celgard Co., Ltd.) sandwiched therebetween, and then placed in a pressing mold filled with the electrolyte solution (model: LBC322-01H, purchased from Shenzhen Capchem Technology Co., Ltd.), and sealed to form a laminated lithium-ion cell. The laminated lithium-ion cell was in a size of 41 mm×34 mm×53 mm.

Test Example 6: Capacity

Lithium-ion cells of Examples 1B to 12B and Comparative Examples 1B and 5B were used as test samples. With the following testing conditions, the capacities of the respective fifth cycles of the lithium-ion cells were recorded and compared with each other. Results are listed in Table 3.

Herein, the testing conditions of each charge-discharge cycle are described as follows:
- Charging mode: constant current-constant voltage (CCCV);
- Discharging mode: constant current (CC);
- Charging voltage: 4.2 volts (V);
- Charging current: 0.2 C;
- Discharging voltage: 2.8 V;
- Discharging current: 0.2 C; and
- Test temperature: about 55° C.

Discussion on Experimental Results

The results of the aforesaid test examples 1 to 6 are summarized in Tables 2 and 3 below.

As shown in Table 2, the first surfaces and the second surfaces of the electrolytic copper foils of Examples 1 to 12 analyzed by GIXRD each had a ratio of $(I_1+I_2)/(I_1+I_2+I_3)$ more than 0.83 and a value of $(W_1+W_2)$ less than 0.80°, and thus these electrolytic copper foils could effectively resist the corrosion by the electrolyte solution in the lithium-ion cell. That is, these electrolytic copper foils had good corrosion resistance to the electrolyte solution.

TABLE 2

$(I_1 + I_2)/(I_1 + I_2 + I_3)$ of the 1st and 2nd surfaces and $(W_1 + W_2)$ of the 1st and 2nd surfaces of the electrolytic copper foils of Examples 1 to 12 (E1 to E12) and Comparative Examples 1 to 5 (C1 to C5) as well as corrosion resistance assessment results of the electrolytic copper foils to the electrolyte solution

| | $(I_1 + I_2)/(I_1 + I_2 + I_3)$ | | $(W_1 + W_2)$ | | Corrosion |
|---|---|---|---|---|---|
| | 1st Surface | 2nd Surface | 1st Surface | 2nd Surface | Resistance |
| E1 | 0.87 | 0.88 | 0.73 | 0.55 | ○ |
| E2 | 0.85 | 0.84 | 0.49 | 0.6 | ○ |
| E3 | 0.89 | 0.86 | 0.34 | 0.49 | ○ |
| E4 | 0.86 | 0.89 | 0.44 | 0.59 | ○ |
| E5 | 0.95 | 0.92 | 0.29 | 0.44 | ○ |
| E6 | 0.89 | 0.85 | 0.37 | 0.55 | ○ |
| E7 | 0.89 | 0.91 | 0.44 | 0.59 | ○ |
| E8 | 0.88 | 0.87 | 0.45 | 0.48 | ○ |
| E9 | 0.94 | 0.90 | 0.33 | 0.53 | ○ |
| E10 | 0.90 | 0.89 | 0.43 | 0.44 | ○ |

TABLE 2-continued $(I_1 + I_2)/(I_1 + I_2 + I_3)$ of the $1^{st}$ and $2^{nd}$ surfaces and $(W_1 + W_2)$ of the $1^{st}$ and $2^{nd}$ surfaces of the electrolytic copper foils of Examples 1 to 12 (E1 to E12) and Comparative Examples 1 to 5 (C1 to C5) as well as corrosion resistance assessment results of the electrolytic copper foils to the electrolyte solution

| | $(I_1 + I_2)/(I_1 + I_2 + I_3)$ | | $(W_1 + W_2)$ | | Corrosion |
|---|---|---|---|---|---|
| | $1^{st}$ Surface | $2^{nd}$ Surface | $1^{st}$ Surface | $2^{nd}$ Surface | Resistance |
| E11 | 0.93 | 0.87 | 0.31 | 0.46 | O |
| E12 | 0.84 | 0.90 | 0.47 | 0.52 | O |
| C1 | 0.81 | 0.84 | 0.81 | 0.54 | X |
| C2 | 0.84 | 0.91 | 0.82 | 0.55 | X |
| C3 | 0.82 | 0.86 | 0.54 | 0.51 | X |
| C4 | 0.70 | 0.88 | 0.92 | 0.54 | X |
| C5 | 0.80 | 0.92 | 0.62 | 0.58 | X |

On the contrary, for the electrolytic copper foils of Comparative Examples 1 to 5, the first surface and the second surface of each electrolytic copper foil did not have a ratio of $(I_1+I_2)/(I_1+I_2+I_3)$ more than or equal to 0.83 and a value of $(W_1+W_2)$ less than or equal to 0.80° at the same time, so the electrolytic copper foil could not have required corrosion resistance to the electrolyte solution. The electrolytic copper foils of Comparative Examples 1 to 5 were not conducive to the application of lithium-ion cells.

From the further study of the results of Comparative Examples 1 to 5, the electrolytic copper foils of Comparative Examples 1 and 4 could not exhibit good corrosion resistance because their first surfaces had ratios of $(I_1+I_2)/(I_1+I_2+I_3)$ less than 0.83 and values of $(W_1+W_2)$ more than 0.80°; the electrolytic copper foil of Comparative Example 2 having a ratio of $(I_1+I_2)/(I_1+I_2+I_3)$ more than or equal to 0.83 on the first surface could not exhibit good corrosion resistance either because its first surface had a value of $(W_1+W_2)$ more than 0.80°; and the electrolytic copper foils of Comparative Examples 3 and 5 each having a value of $(W_1+W_2)$ less than or equal to 0.80° could not exhibit good corrosion resistance because their first surfaces had ratios of $(I_1+I_2)/(I_1+I_2+I_3)$ less than 0.83. It can be seen that the first surface and second surface of the electrolytic copper foil both have appropriate ratios of $(I_1+I_2)/(I_1+I_2+I_3)$ and appropriate values of $(W_1+W_2)$ can ensure the electrolytic copper foil to have good corrosion resistance to the electrolyte solution.

In addition, other experimental significance can be obtained from the combined results of GIXRD analysis and Sq of the electrolytic copper foil. As shown in Table 3, the first surface of each of the electrolytic copper foils of Examples 1 to 10 further had an appropriate Sq (0.20 μm to 0.55 μm) on the condition that the first and second surfaces thereof both had ratios of $(I_1+I_2)/(I_1+I_2+I_3)$ more than or equal to 0.83 and values of $(W_1+W_2)$ less than or equal to 0.80°, such that these electrolytic copper foils not only had good corrosion resistance to the electrolyte solution but also exhibited good coating quality after they were coated with active materials. Therefore, the prepared lithium-ion cells of Examples 1B to 10B had characteristic of high capacity. More specifically, the lithium-ion cells of Examples 1B to 10B each had capacity more than 300 mAh/g in the fifth charge-discharge cycle.

TABLE 3

$(I_1 + I_2)/(I_1 + I_2 + I_3)$ of the $1^{st}$ and $2^{nd}$ surfaces, $(W_1 + W_2)$ of the $1^{st}$ and $2^{nd}$ surfaces, Sq of $1^{st}$ and $2^{nd}$ surfaces, the absolute difference (AD) of Sq between the $1^{st}$ and $2^{nd}$ surfaces, yield Strength ($\sigma_y$), corrosion resistance, and coating quality of each of the electrolytic copper foils of E1 to E12 and C1 to C5 as well as capacity of the lithium-ion cell in the fifth charge-discharge cycle

| | $\dfrac{(I_1 + I_2)}{(I_1 + I_2 + I_3)}$ | | $(W_1 + W_2)$ | | Sq (μm) | | | $\sigma_y$ | Corrosion | Coating | Capacity |
|---|---|---|---|---|---|---|---|---|---|---|---|
| | $1^{st}$ Surface | $2^{nd}$ surface | $1^{st}$ Surface | $2^{nd}$ surface | $1^{st}$ Surface | $2^{nd}$ surface | AD | (MPa) | Resistance | Quality | (mAh/g) |
| E1 | 0.87 | 0.88 | 0.73 | 0.55 | 0.2 | 0.25 | 0.05 | 240 | O | O | 341 |
| E2 | 0.85 | 0.84 | 0.49 | 0.6 | 0.31 | 0.37 | 0.06 | 252 | O | O | 333 |
| E3 | 0.89 | 0.86 | 0.34 | 0.49 | 0.43 | 0.29 | 0.14 | 260 | O | O | 321 |
| E4 | 0.86 | 0.89 | 0.44 | 0.59 | 0.34 | 0.45 | 0.11 | 239 | O | O | 329 |
| E5 | 0.95 | 0.92 | 0.29 | 0.44 | 0.47 | 0.5 | 0.03 | 238 | O | O | 319 |
| E6 | 0.89 | 0.85 | 0.37 | 0.55 | 0.44 | 0.47 | 0.03 | 250 | O | O | 318 |
| E7 | 0.89 | 0.91 | 0.44 | 0.59 | 0.53 | 0.43 | 0.1 | 240 | O | O | 317 |
| E8 | 0.88 | 0.87 | 0.45 | 0.48 | 0.55 | 0.45 | 0.1 | 231 | O | O | 304 |
| E9 | 0.94 | 0.90 | 0.33 | 0.53 | 0.49 | 0.4 | 0.09 | 241 | O | O | 318 |
| E10 | 0.90 | 0.89 | 0.43 | 0.44 | 0.5 | 0.42 | 0.08 | 242 | O | O | 313 |
| E11 | 0.93 | 0.87 | 0.31 | 0.46 | 0.62 | 0.29 | 0.33 | 268 | O | Δ | 288 |
| E12 | 0.84 | 0.90 | 0.47 | 0.52 | 0.59 | 0.44 | 0.15 | 231 | O | Δ | 296 |
| C1 | 0.81 | 0.84 | 0.81 | 0.54 | 0.4 | 0.36 | 0.04 | 216 | X | O | 330 |
| C2 | 0.84 | 0.91 | 0.82 | 0.55 | 0.37 | 0.2 | 0.17 | 230 | X | O | 336 |
| C3 | 0.82 | 0.86 | 0.54 | 0.51 | 0.58 | 0.55 | 0.03 | 215 | X | Δ | 292 |
| C4 | 0.70 | 0.88 | 0.92 | 0.54 | 0.66 | 0.33 | 0.33 | 214 | X | Δ | 281 |
| C5 | 0.80 | 0.92 | 0.62 | 0.58 | 0.46 | 0.45 | 0.01 | 191 | X | O | 322 |

In contrast, the electrolytic copper foils of Examples 11 and 12 and Comparative Examples 3 and 4 could not possess good coating quality after they were coated with the active materials because their first surfaces did not have an Sq within the appropriate range. In addition, the prepared lithium-ion cells of Examples 11B and 12B and Comparative Examples 3B and 4B had capacity less than 300 mAh/g in the fifth charge-discharge cycle, which was much lower than those of lithium-ion cells of Examples 1B to 10B, indicating that they were less applicable to the final products with demands of high capacity.

In conclusion, by controlling the intensity of the characteristic peak of (111) plane ($I_1$), the intensity of the characteristic peak of (200) plane ($I_2$), the intensity of the characteristic peak of (220) plane ($I_3$) as well as the FWHM of the characteristic peak of (111) plane ($W_1$) and the FWHM of a characteristic peak of (200) plane ($W_2$) of each of the first and second surfaces, it is beneficial to improve the electrolytic copper foil's corrosion resistance to the electrolyte solution, thereby improving the safety of the lithium-ion cell.

In addition, Sq of the first surface of the electrolytic copper foil can be further controlled based on different needs, so that the electrolytic copper foil possesses good coating quality after coating with active materials and the lithium-ion cell can further have enhanced capacity.

Even though numerous characteristics and advantages of the instant disclosure have been set forth in the foregoing description, together with details of the structure and features of the disclosure, the disclosure is illustrative only. Changes may be made in the details, especially in matters of material, shape, size, and arrangement of parts within the principles of the disclosure to the full extent indicated by the broad general meaning of the terms in which the appended claims are expressed.

What is claimed is:

1. An electrolytic copper foil, comprising a first surface and a second surface opposite the first surface,
   wherein the first surface and the second surface are analyzed by grazing incidence X-ray diffraction and each have an intensity of a characteristic peak of (111) plane denoted by $I_1$, an intensity of a characteristic peak of (200) plane denoted by $I_2$, an intensity of a characteristic peak of (220) plane denoted by $I_3$, a full width at half maximum of the characteristic peak of (111) plane denoted by $W_1$, and a full width at half maximum of the characteristic peak of (200) plane denoted by $W_2$,
   wherein the first surface and the second surface each have a ratio of $(I_1+I_2)/(I_1+I_2+I_3)$ more than or equal to 0.83 and a value of $(W_1+W_2)$ less than or equal to 0.80°.

2. The electrolytic copper foil as claimed in claim 1, wherein the electrolytic copper foil has a yield strength more than 230 MPa.

3. The electrolytic copper foil as claimed in claim 1, wherein the first surface and the second surface each have the ratio of $(I_1+I_2)/(I_1+I_2+I_3)$ more than or equal to 0.84 and less than or equal to 1.00.

4. The electrolytic copper foil as claimed in claim 1, wherein the first surface and the second surface each have the value of $(W_1+W_2)$ more than or equal to 0.25° and less than or equal to 0.75°.

5. The electrolytic copper foil as claimed in claim 3, wherein the first surface and the second surface each have the value of $(W_1+W_2)$ more than or equal to 0.25° and less than or equal to 0.75°.

6. The electrolytic copper foil as claimed in claim 1, wherein the electrolytic copper foil has a yield strength more than or equal to 231 MPa and less than or equal to 300 MPa.

7. The electrolytic copper foil as claimed in claim 3, wherein the electrolytic copper foil has a yield strength more than or equal to 231 MPa and less than or equal to 300 MPa.

8. The electrolytic copper foil as claimed in claim 4, wherein the electrolytic copper foil has a yield strength more than or equal to 231 MPa and less than or equal to 300 MPa.

9. The electrolytic copper foil as claimed in claim 5, wherein the electrolytic copper foil has a yield strength more than or equal to 231 MPa and less than or equal to 300 MPa.

10. The electrolytic copper foil as claimed in claim 1, wherein the first surface has a root mean square height (Sq) more than or equal to 0.20 μm and less than or equal to 0.55 μm.

11. The electrolytic copper foil as claimed in claim 5, wherein the first surface has a root mean square height (Sq) more than or equal to 0.20 μm and less than or equal to 0.55 μm.

12. The electrolytic copper foil as claimed in claim 6, wherein the first surface has a root mean square height (Sq) more than or equal to 0.20 μm and less than or equal to 0.55 μm.

13. The electrolytic copper foil as claimed in claim 10, wherein the second surface has a root mean square height (Sq) more than or equal to 0.20 μm and less than or equal to 0.55 μm.

14. The electrolytic copper foil as claimed in claim 11, wherein the second surface has a root mean square height (Sq) more than or equal to 0.20 μm and less than or equal to 0.55 μm.

15. The electrolytic copper foil as claimed in claim 12, wherein the second surface has a root mean square height (Sq) more than or equal to 0.20 μm and less than or equal to 0.55 μm.

16. The electrolytic copper foil as claimed in claim 13, wherein an absolute difference of the Sq of the first surface and the Sq of the second surface of the electrolytic copper foil is less than 0.15 μm.

17. The electrolytic copper foil as claimed in claim 14, wherein an absolute difference of the Sq of the first surface and the Sq of the second surface of the electrolytic copper foil is less than 0.15 μm.

18. The electrolytic copper foil as claimed in claim 15, wherein an absolute difference of the Sq of the first surface and the Sq of the second surface of the electrolytic copper foil is less than 0.15 μm.

19. An electrode of a lithium-ion cell, comprising the electrolytic copper foil as claimed in claim 1.

20. A lithium-ion cell, comprising the electrode as claimed in claim 19.

* * * * *